(12) United States Patent
Amend et al.

(10) Patent No.: US 12,212,640 B2
(45) Date of Patent: Jan. 28, 2025

(54) TECHNIQUES FOR PROVIDING A GENERIC MULTIPATH SYSTEM BY A FLEXIBLE SELECTION OF NETWORK PROTOCOLS

(71) Applicant: DEUTSCHE TELEKOM AG, Bonn (DE)

(72) Inventors: Markus Amend, Nidda (DE); Eckard Bogenfeld, Carlsberg (DE); Anna Brunstrom, Karlstad (SE); Marcus Pieska, Karlstad (SE); Andreas Kassler, Karlstad (SE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/686,879

(22) PCT Filed: Aug. 30, 2022

(86) PCT No.: PCT/EP2022/074044
§ 371 (c)(1),
(2) Date: Feb. 27, 2024

(87) PCT Pub. No.: WO2023/031173
PCT Pub. Date: Mar. 9, 2023

(65) Prior Publication Data
US 2024/0275870 A1 Aug. 15, 2024

(30) Foreign Application Priority Data
Aug. 31, 2021 (EP) ..................................... 21193902

(51) Int. Cl.
*H04L 69/14* (2022.01)
(52) U.S. Cl.
CPC .................... *H04L 69/14* (2013.01)

(58) Field of Classification Search
CPC ................................ H04L 45/24; H04L 69/14
See application file for complete search history.

(56) References Cited

U.S. PATENT DOCUMENTS

| | | | |
|---|---|---|---|
| 11,425,022 B1 * | 8/2022 | Singh | .................. H04L 12/4633 |
| 2019/0387451 A1 | 12/2019 | Kucera et al. | |

(Continued)

FOREIGN PATENT DOCUMENTS

| | | | |
|---|---|---|---|
| CN | 101673107 A | * | 3/2010 |
| CN | 110915181 A | | 3/2020 |

(Continued)

OTHER PUBLICATIONS

Bickhart et al., "Transparent TCP-to-SCTP Translation Shim Layer," University of Delaware. (Year: 2005).*

(Continued)

*Primary Examiner* — Alina A Boutah
(74) *Attorney, Agent, or Firm* — LEYDIG, VOIT & MAYER, LTD.

(57) ABSTRACT

A compatibility layer, in particular a shim layer, is configured to provide flexible choice of network protocols in a multi-path environment. The compatibility layer includes a first set of communication interfaces that is associated to a first communication link, a second set of communication interfaces that is associated to a second communication link, an access unit configured to get access to a library of network protocols, and a converting unit. The converting unit is configured to convert data packets received from a network entity via the first communication link and/or the second communication link to at least one of the network protocols; and/or the converting unit is configured to convert data packets received from a communication network via the first communication link and/or the second communication link to one standard network protocol.

13 Claims, 4 Drawing Sheets

(56) References Cited

U.S. PATENT DOCUMENTS

| | | | |
|---|---|---|---|
| 2020/0403928 A1 | 12/2020 | Amend et al. | |
| 2021/0126989 A1* | 4/2021 | Amend | ............... H04L 65/1069 |
| 2021/0234794 A1 | 7/2021 | Amend et al. | |
| 2022/0407799 A1* | 12/2022 | Amend | ................. H04L 69/163 |

FOREIGN PATENT DOCUMENTS

| | | | | |
|---|---|---|---|---|
| CN | 111801915 A | | 10/2020 | |
| CN | 112262552 A | | 1/2021 | |
| EP | 2273760 A1 | * | 1/2011 | ....... H04L 29/12056 |
| EP | 2945415 A1 | | 11/2015 | |
| EP | 3119057 A1 | * | 1/2017 | |
| EP | 3531637 A1 | | 8/2019 | |
| EP | 3544363 A1 | * | 9/2019 | ............. H04L 69/14 |
| WO | WO-2018156681 A1 | * | 8/2018 | ............. H04L 45/24 |
| WO | WO-2019154763 A1 | * | 8/2019 | ............. H04L 45/24 |
| WO | WO-2019166307 A1 | * | 9/2019 | ............. H04L 45/24 |

OTHER PUBLICATIONS

Stephen A. Edwars, "SHIM: A Language for Hardware/Software Integration," SLAP 2005 Preliminary Version, Department of Computer Science, Columbia University. (Year: 2005).*

"Design your interface—with a "shim" layer!," Saurav (/EN/DASHBOARD/29/PROFILE). (Year: 2016).*

Nordmark et al., "Shim6: Level 3 Multihoming Shim Protocol for IPV6," Network Working Group E,.Request for Comments: 5533, Sun Microsystems, UC3M, Jun. 2009. (Year: 2009).*

Android—Understanding the Shim; hadess, White Paper, Dec. 6, 2023 (Year: 2023).*

* cited by examiner

TECHNIQUES FOR PROVIDING A GENERIC MULTIPATH SYSTEM BY A FLEXIBLE SELECTION OF NETWORK PROTOCOLS

CROSS-REFERENCE TO PRIOR APPLICATIONS

This application is a U.S. National Phase application under 35 U.S.C. § 371 of International Application No. PCT/EP2022/074044, filed on Aug. 30, 2022, and claims benefit to European Patent Application No. EP 21193902.0, filed on Aug. 31, 2021. The International Application was published in English on Mar. 9, 2023 as WO 2023/031173 A1 under PCT Article 21(2).

FIELD

The invention relates to a method, a multipath communication system and network entity to provide a generic multipath system by a flexible selection of network protocols.

BACKGROUND

Currently, many multipath network protocols enable communication over more than one communication link in a multipath data transmission scenario. For example, these multipath network protocols are MPTCP [1], MP-DCCP [3], MP-QUIC [2] or CMT-SCTP [4] that allow establishing more than one communication flow between a sender entity and a receiver entity over a communication network.

FIG. 1 shows a common multipath communication system 1. Typically, a sender entity 3 is being provided with the ability to decide how to schedule a data traffic across multiple communication links 11. For that purpose, the sender entity 3 comprises a scheduling unit 5, commonly simply called a scheduler 5, that distributes the data packets 7 of the data traffic to each of the multiple communication links 11. An efficient scheduling relies on a proper path estimation, which characterizes transport capabilities of the different communication links 11. For example, it is not desirable to distribute too many data packets to a communication link 11 that cannot handle such an amount of traffic hence, the communication links 11 can be characterized by parameters like the available bandwidth, round-trip time and/or other parameters. Using MPTCP [1], MP-DCCP [3], MP-QUIC [2] or CMT-SCTP [4] is a possibility to gain those parameters that characterize the communication links by employing a feedback loop and/or congestion control approaches like New Reno. Cubic, BBR etc.

While the sender entity 3 distributes the data packets 7 across different communication links 11, a receiver entity 13 may take care to reassemble the split traffic and to reconstruct the original order sequence via a reordering unit 15. Out-of-order delivery frequently occurs at the receiver entity 13 due to the fact that different communication links 11 show different data packets transport characteristics like latency, error rate and/or bandwidth in order to reconstruct the original order of sequence the reordering unit 15 can be used as described in [5].

In the state-of-the-art, the different multipath components, in particular the scheduler 5, are tightly coupled to a distinct network protocol. This means that a scheduler 5 is equipped only with information about a single network protocol and is therefore only able to provide a transmission with this single network protocol for all the available different communication links 11. For example, MP-TCP is coupled with the transport control protocol (TCP) [6], the MP-DCCP with the Datagram Congestion Control Protocol (DCCP) [7], the MP-QUIC with the QUIC [8] protocol and the CMT-SCTP with the Stream Control Transmission Protocol (SCTP) [9]. GRE bonding is an example of a Layer 3 protocol.

However, each of these transport protocols has its individual advantages and disadvantages with respect to the properties of a single communication link. Hence, it follows from the current approach that it is not possible to combine the transport protocols in a flexible way to combine their individual advantages and to mitigate their individual disadvantages. In that context. CN 101 673 107 teaches a multi-path serial communication converter and a distributed control system applied by same. The multi-path serial communication converter reads required data, states and the like from information uploaded by various devices with different serial communication interfaces, serial communication protocols and serial communication parameters, and processes and clears up the data, states and the like to perform data transmission with an upper computer uniformly in a common standard serial communication protocol, so the multipath serial communication converter comprises a plurality of first communication interfaces compatible with a lower computer, a second communication interface compatible with the upper computer, a plurality of slave microcontrollers, and a master microcontroller, wherein the plurality of slave microcontrollers uses a first serial communication protocol compatible with a serial communication protocol corresponding to the lower computer to perform data communication with the lower computer through the first communication interfaces; the master microcontroller uses a second serial communication protocol compatible with the standard serial communication protocol of the upper computer to perform data communication with the upper computer through the second communication interface; and the master microcontroller and the slave microcontrollers transmit data through an internal data bus.

SUMMARY

In an exemplary embodiment, the present invention provides a compatibility layer, in particular a shim layer, configured to provide flexible choice of network protocols in a multi-path environment. The compatibility layer comprises a first set of communication interfaces that is associated to a first communication link, a second set of communication interfaces that is associated to a second communication link, an access unit configured to get access to a library of network protocols, and a converting unit. The converting unit is configured to convert data packets received from a network entity via the first communication link and/or the second communication link to at least one of the network protocols: and/or the converting unit is configured to convert data packets received from a communication network via the first communication link and/or the second communication link to one standard network protocol.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
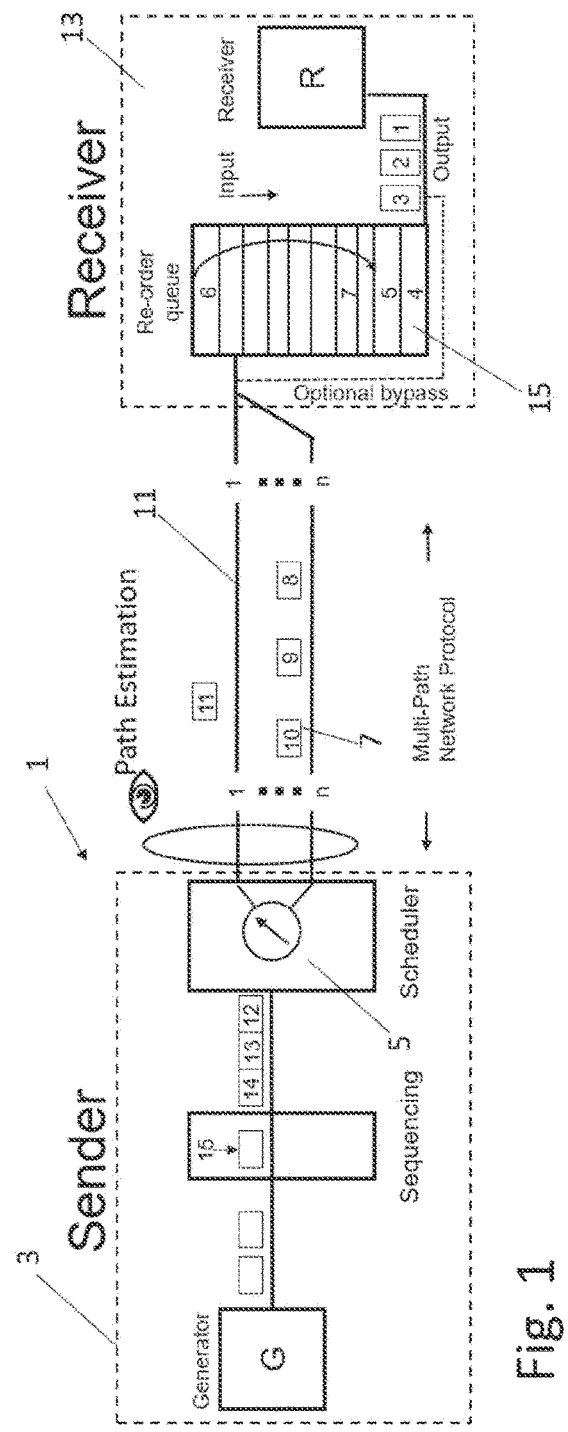
FIG. 1 shows a typical multipath communication system.

In the view of the above background section, exemplary embodiments of the present invention provide techniques for a generic or flexible implementation of multipath network protocols in order to benefit from the individual advantages of different network protocols.

The features of the various aspects of the invention described below or the various examples of implementation may be combined with each other, unless this is explicitly excluded or is technically impossible.

According to a first aspect of the invention, a compatibility layer, in particular a shim layer, is provided. The compatibility layer is configured to provide flexible choice of network protocols in a multi-path environment. The compatibility layer comprises:

a first set of communication interfaces that is associated to
  a first communication link;
    wherein a first communication interface of the first set communication interfaces can be configured to communicate with a first port of a network entity, in particular a user equipment or a server, in particular with a first port of a multipath scheduler of the network entity. That first port is associated to the first communication link. A second communication interface of the first set of communication interfaces is configured to communicate with a communication network that is configured to provide the first communication link; This provides an input-output arrangement for the first communication link of the compatibility layer; The communication network transmits the data packets to further network entity within the communication network, in particular to the receiver entity;
a second set of communication interfaces that is associated to a second communication link;
  wherein a first communication interface of the second set of communication interfaces is configured to communicate with a second port of the network entity, in particular with a second port of the multipath scheduler of the network entity. That second port is associated to the second communication link. A second communication interface of the second set of communication interfaces is configured to communicate with the communication network that is configured to provide the second communication link: This provides an input-output arrangement of the second communication link for the compatibility layer; in particular, the first and the second communication link can be technically different like mobile techniques vs. fixed line techniques or can be based on different network protocols;
an access unit configured to get access to a library of network protocols, in particular multipath network protocols:
  the library can comprise single path protocols, multipath network protocols like MP-transport control protocol (TCP), the Datagram Congestion Control Protocol (DCCP), QUIC protocol, the Stream Control Transmission Protocol (SCTP), GRE, IP and/or other network protocols. The access unit is configured to retrieve information about theses protocols, in particular information that is necessary to convert data packets to the appropriate network protocol. The library of network protocols can be stored in the compatibility layer; or can be accessed via a library interface. In the latter case, the library can be stored in a host operating system and/or further network entity and/or database within the communication network. If the library is stored within the compatibility layer, this provides the advantage of reducing data traffic and having a fast access to the required information. On the other hand, storing the network protocols in an external library provides the advantage that the network protocols can be easily updated and maintained.
Functionally, the access unit can be implemented as a software solution on a processor of the compatibility layer.
  a converting unit, wherein the converting unit is configured to convert data packets received from a network entity via the first communication link and/or the second communication link to at least one of the network protocols
  Functionally, the converting unit can be implemented as a software solution on the processor of the compatibility layer.
  The converting can also comprise encapsulation.
  The data packets from the network entity are received via the first communication interface of the first set of communication interfaces and/or via the first communication interface of the second set of communication interfaces.
  This provides the effect that the compatibility layer can be used as a sender entity to convert the data packets of different communication paths in a flexible way to a common or to different network protocols.
  and/or
wherein the converting unit is configured to convert data packets received from a communication network via the first communication link and/or the second communication link to one standard network protocol.
This provides the effect that the compatibility layer can be used as a receiver entity to convert the data packets of different communication paths in a flexible way to a common standard network protocol that for example can be processed by a subsequent reordering unit. This can also comprise de-capsulation. Hence, the reordering unit does not need to know about all possible network protocols because the compatibility layer does the appropriate preprocessing to a format that is known to the reordering unit. In that sense, the standard protocol is a protocol of which the properties are commonly known and can be processed in sequent steps. Typically, the standard protocol is already implemented within many algorithms in many devices. The standard network protocol and its properties are known to the person skilled in the art. The standard protocol can be a standard protocol in that sense, that a technical community has agreed on using "only" that protocol but within the context of the invention it can also mean that it is commonly known. In that sense, the standard network protocol can also be described as a default network protocol or even more simply as a protocol.

This provides the advantage of enabling a generic or universal implementation of multipath components such as the scheduler, reordering unit and/or a sequencing unit, which independent from a particular network protocol.

The invention enables a multipath communication system that is independent from a particular network protocol and therefore overcomes the tight coupling of today's multipath protocols to the respective multipath components. In other words, the multipath system is abstracted or decoupled from transport mechanisms.

This allows selecting any network protocol between network entities, in particular between the sender entity and receiver entity, and even gives the opportunity to select a mix of network protocols. A dedicated mix of network protocols for each of the different communication links provides the possibility to gain a synergetic effect because the advantages of the individual network protocols can be exploited.

For example, a multipath communication system with the compatibility layer described above can select the following mixture of network protocols for the combination of a fixed communication link (DSL/Fiber/Coax), for example as the first communication link, and cellular communication link (2G-5G), for example as the second communication link:
- the IP network protocol for the fixed communication link;
- the TCP network protocol for the cellular communication link.

Such a scenario is commonly described as Hybrid Access. This scheme benefits from known characteristics of the fixed access communication link so that it is possible to use the IP network protocol that is basically free from overhead traffic that is commonly used to determine properties of the respective communication link. On the other hand, for the more volatile cellular communication link, it is desirable to know at least certain performance properties of this link. The TCP network protocol with its inherent feedback loop provides a way to gain the appropriate characteristics of the cellular access link.

In another scenario, when a strict reliability from TCP is undesirable, PR-SCTP or DCCP can be the preferred protocol for all or individual communication links.

In yet another scenario QUIC can be used in a reliable mode on one of the communication links and in an unreliable mode using the DATAGRAM extension on another link.

The compatibility layer can comprise a processor unit that is configured to execute code of the compatibility layer. In particular, the processor unit can execute an algorithm for the conversion of the data packets to selected network protocols and/or the conversion of data packets with a certain network protocol to a standard network protocol.

This provides the advantage that the compatibility layer can serve as a standalone entity within a multipath communication system.

In an embodiment, the compatibility layer is configured to provide performance information about the first communication link and/or the second communication link to a multipath unit of the network entity, in particular to the scheduler of the multipath unit.

This provides the advantage that the multipath scheduler receives performance information about the respective communication links and can decide how to distribute the data packets amongst the different communication links, in particular between the first and the second communication link. A generic multipath unit does not necessarily comprise a way to gain those performance information.

The performance information can comprise specific network protocol information, such as CWND, bytes-in-flight, RTT, latency, packet loss rate, congestion notification, DSL sync rate and/or path cost values.

This provides the advantage that at least some of these parameters are inherent to the implementation of different network protocols and provide at the same time a comprehensive overview about the performance of the individual communication links that enables the scheduler entity to distribute the data traffic accordingly.

The compatibility layer can be configured to provide the performance information via the first or the second communication interface to the network entity or that the compatibility layer shows a dedicated performance-information interface to provide the performance information to the network entity.

The first option provides the advantage that it makes use of the communication interfaces that are already being implemented within the compatibility layer. On the other hand, the latter option provides the advantage that the dedicated performance-information interface can be implemented that is tailored to delivering the performance-information and does not interfere with the other data packets.

In an embodiment, the compatibility layer comprises a measuring unit to evaluate and to generate performance information of the first and/or the second communication link or that the compatibility layer comprises a measuring-information interface that is configured to provide access to an external measuring unit.

This provides the advantage that the compatibility layer can gain the performance information of the first and/or the second communication link in order to make its own selection to which network protocol the respective data packets of the first and/or the second communication link shall be converted. In addition, the compatibility layer can transmit this performance information to other network entities within the communication network.

In an embodiment, the compatibility layer comprises a selection unit that is configured to perform a selection which network protocol is to be used for the first and/or the second communication link. Functionally, the selection unit can be implemented as a software solution on a processor of the compatibility layer.

This provides the advantage that the compatibility layer can decide independently from other devices via its selection unit which network protocol is to be chosen for the respective communication links. In particular, this enables the compatibility layer to choose different network protocols for different communication links.

In an embodiment, the selection unit is configured to perform the selection based on the performance information about the first communication link and/or the second communication link and based on the properties of the different network protocols.

This provides the advantage that the selection unit can decide via an appropriate selection algorithm which network protocol fits best to a certain performance of the first and/or the second communication link. This enables the selection unit to select a mixture of different network protocols for the respective communication links that provide the best overall performance for delivering the data packets from one network entity to the other.

In an embodiment, the selection is based on demand and/or used services and/or access type and/or access characteristics and/or time and/or location and/or bottleneck/congestion and/or multi-connectivity scenarios.

This provides the advantage that the selection can be tailored in the best possible way to the actual use case.

In an embodiment, the selection unit is based on AI and/or machine learning mechanisms.

This provides the advantage that the algorithm is constantly improving over time.

In an embodiment, the compatibility layer comprises a re-ordering interface that is configured to transmit the data packets that have been converted to the standard network protocol to a re-ordering unit of a network entity. The re-ordering interface can be designed as being single port that comprises the data packets of the different communication links or it can be designed as having a part for each of the different communication links. In particular, the re-ordering interface can be first and the second set of communication interfaces.

This provides the advantage that the compatibility layer can be used either for the sender entity and/or the receiver entity without the need of performing a hardware adaption. An algorithm that is designed accordingly decides if the compatibility layer acts as a unit that converts data packets in a flexible way to different network protocols or if the compatibility layer acts to reconvert the data packets received in one or multiple network protocols to a standard network protocol so that it can be processed within the network entity.

In an embodiment, the standard network protocol is one of the network protocols of the library of network protocols.

This provides the advantage that no additional network protocol needs to be designed. In particular, it is advantageous to choose the network protocol amongst the library of network protocols that is most generic.

In a preferable setup, the selection of the individual network protocols and their tuning parameters (buffer sizes, CC, reliability . . . ) depends on demand and/or used services and/or access type and/or access characteristics and/or time and/or location and/or bottleneck/congestion and/or multi-connectivity scenario (Hybrid Access, ATSSS, . . . ). In a more advanced setup this can be combined with some learning algorithm which selects the network protocol(s) based on historic data.

According to a second aspect of the invention, a network unit is provided that is configured for communicating in a multipath communication environment, comprising a compatibility layer as described above. The network unit can comprise as generic multipath components: A generator unit, a sequencing unit and/or a multipath scheduler. In an embodiment, the converting unit described above can be associated to the multipath scheduler. By the compatibility layer providing the information about network protocols, in particular the network protocol conversion information, to the converting unit of the multipath scheduler, this provides an alternate solution to obtain a more generic multipath scheduler.

This provides the advantage that this network entity can transmit data packets over a communication network in a flexible way by choosing a network protocol that fits best to the different communication links within the multipath communication environment of the communication network. For that purpose the network unit can comprise communication interfaces for each of the communication links or it can simply make use of the communication interfaces of the compatibility layer. A network entity that is equipped with the compatibility layer as described above, can act as a sender entity and/or as a receiver entity. Possible embodiments of such a network entity can be user equipment like smart phones, computers etc. or servers, in particular servers of network service providers. Typical state-of-the-art smart phones already comprise multipath units, but those multipath units are tightly coupled to a certain network protocol.

The invention now provides the advantage of facilitating a generic multipath unit approach that can chose the best network protocol for each of the communication links in a multipath scenario in a flexible way.

According to a third aspect of the invention, a multipath communication system is provided, the multipath communication system comprising
- a communication network configured to provide at least two communication links, in particular technically different communication links;
- a first network entity comprising a multipath unit configured to send data packets via the two communication links;
- a second network entity configured to receive data packets via the two communication links: the second network entity can comprise a re-ordering unit
- a compatibility layer as described above, wherein the compatibility layer is logically placed between the first network entity and the second network entity in order to perform a conversion of the data packets according to selected network protocols or to perform a conversion from a network protocol to a standard network protocol.

This provides the advantage that the data packets that are exchanged within the multipath communication system over the communication network can have different network protocols that best fit to the requirements of the network units (like service demands etc.) and/or the properties of the communication links.

Additionally, a multipath communication system according to the invention provides two different embodiments:

If the compatibility layer is placed logically between the first network entity and the second network entity that is meant to comprise embodiments in which the compatibility layer is a part of the first and/or of the second network entity. In that sense, the first and/or the second network entity can be built with a compatibility layer according to the invention.

Another use case is that existing network entities that do not comprise a compatibility layer according to the invention can be used in the multipath communication system if their data traffic is guided to the compatibility layer that is placed between those network entities within the network. In that case, it is desirable to locate the compatibility layer as close as possible to those network entities to fully benefit from flexible choice of network protocols. For example, a network service provider could arrange the compatibility layer closely to a server as a separate entity. If the server is only able to provide one network protocol, the data packets of one distinct network protocol could be transmitted to the compatibility layer over a first and/or a second communication interface. The compatibility layer is then able to convert the data packets of the first and/or the second communication interface in a flexible way to any network protocol stored within the library.

According to a fourth aspect of the invention, a method is provided to enable a flexible choice of network protocols in a multi-path environment comprising the following steps:
- providing a compatibility layer as described above;
- providing data packets of a first communication link and/or data packets of a second communication link to the compatibility layer;
- converting data packets received from a network via the first communication link and/or the second communication link to at least one of the network protocols and/or converting data packets received from a communication network via the first communication link and/or the second communication link to one standard network protocol.

This provides in principle the same advantages as mentioned in the context of the compatibility layer.

In the following, numerous features of the present invention are explained in detail via preferred embodiments. The present disclosure is not limited to the specifically named combinations of features. Rather, the features mentioned here can be combined into various embodiments according to the invention, unless this is expressly excluded below.

Figure 2:
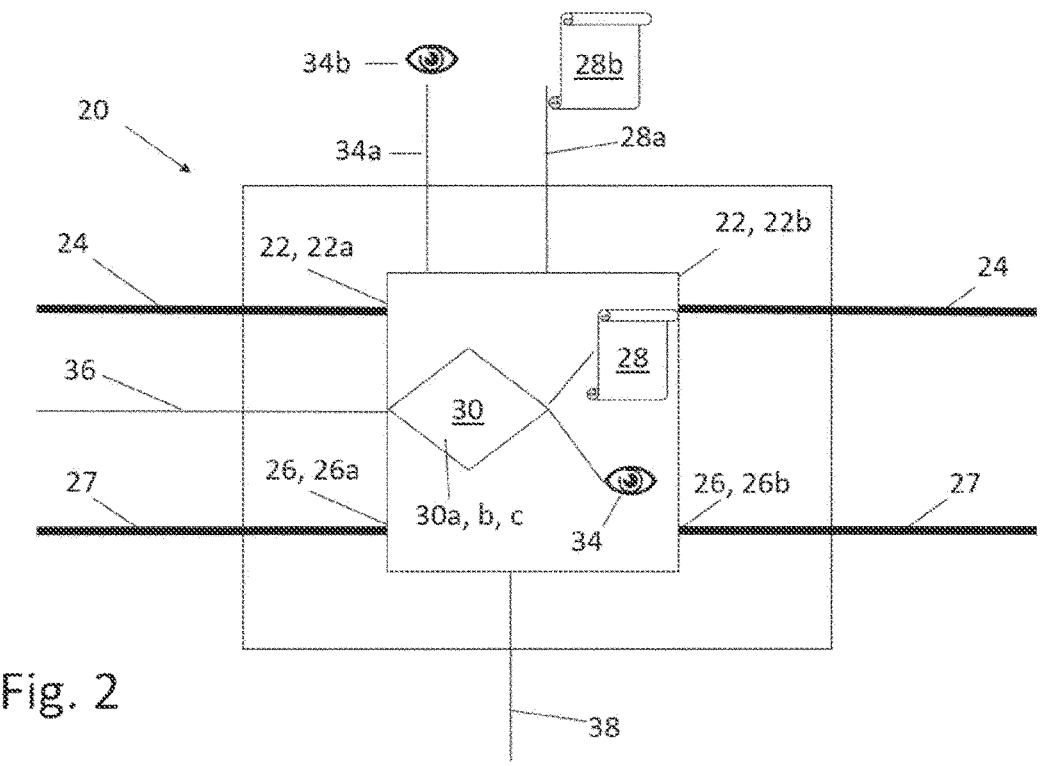
FIG. 2 shows a compatibility layer according to the invention.

FIG. 2 shows a compatibility layer 20, in particular a shim layer 20, that is configured to convert data packets in a flexible way to one or different network protocols, in particular multipath network protocols and/or to convert data packets of different network protocols to a standard network protocol.

The compatibility layer 20 comprises a first set of communication interfaces 22, wherein the first set of communication interfaces can comprise a first communication interface 22a and a second communication interface 22b. The first communication interface 22a and the second communication interface 22b are designed to provide an input and an output channel for a first communication link 24.

The compatibility layer 20 comprises a second set of communication interfaces 26, wherein the second set of communication interfaces can comprise a first communication interface 26a and a second communication interface 26b. The first communication interface 26a and the second communication interface 26b are designed to provide an input and an output channel for a second communication link 27.

The compatibility layer 20 is not limited to providing communication interfaces of only two communication links. In principle, the compatibility layer 20 can be extended to provide a conversion of data packets for multiple number of communication links. In that sense the compatibility layer 20 can be designed with a number of set of communication interfaces that equals the number of communication links.

The compatibility layer 20 comprises a library 28 in which information about the different network protocols and/or the standard network protocol are stored. The compatibility layer 20 can comprise an access unit 30a to retrieve information about the different network protocols and/or the standard network protocol and/or from lower layers. The access unit can be designed as a separate unit or the access unit can be implemented as a software solution on a processor 30. The information enables the processor 30 to perform the respective conversion. The conversion of the data packets can be done by a separate converting unit 30b or the conversion unit can be implemented as a software solution on the processor 30. It is also possible that the compatibility layer 20 comprises an additional interface 28a to library 28b within a communication network. Furthermore, the compatibility layer 20 can comprise a measuring unit 34 that measures properties of the communication links 24, 27. As an alternative, the compatibility layer can comprise an additional interface 34a to a measuring unit 34b within the communication network. The measuring unit 34b also measures the performance properties of the communication links 24, 27.

The processor 30 can act as a selection unit 30a by choosing the appropriate network protocols to which the data packets shall be converted to. In that case the selection unit 30a is implemented as a software solution on the processor. It is also possible that the compatibility layer 20 comprises a separate selection unit 30c. For that purpose, a selection algorithm is implemented on the processing unit 30. The selection unit may take measurements obtained by at least one of the measuring units 34, 34b into account to choose the best combination of network protocols to which the data packets of the communication links 24, 27 shall be converted.

The compatibility layer 20 is configured to provide performance information about the first communication link 24 and/or the second communication link 27 to a multipath unit of a network entity, in particular to the scheduler of the multipath unit via the first communication interfaces 22a, 26b or by implementing and additional performance-information interface 36. This enables the multipath scheduler of the network entity to distribute the data packets accordingly to the different communication links 24, 27.

As a further interface, the compatibility layer 20 can comprise a reordering interface 38 that delivers the data packets to a reordering unit of a receiving network device in a standard network protocol. In principle, the reordering can be applied before or after the conversion to the standard protocol. It is also possible that the standard network protocol data packets are transmitted to the reordering unit via the second communication interfaces 22b, 26b.

The described compatibility layer 20 can be implemented in a sender network entity, within the communication network and/or in a receiving network entity. Details will be given in the following paragraphs.

Figure 3:
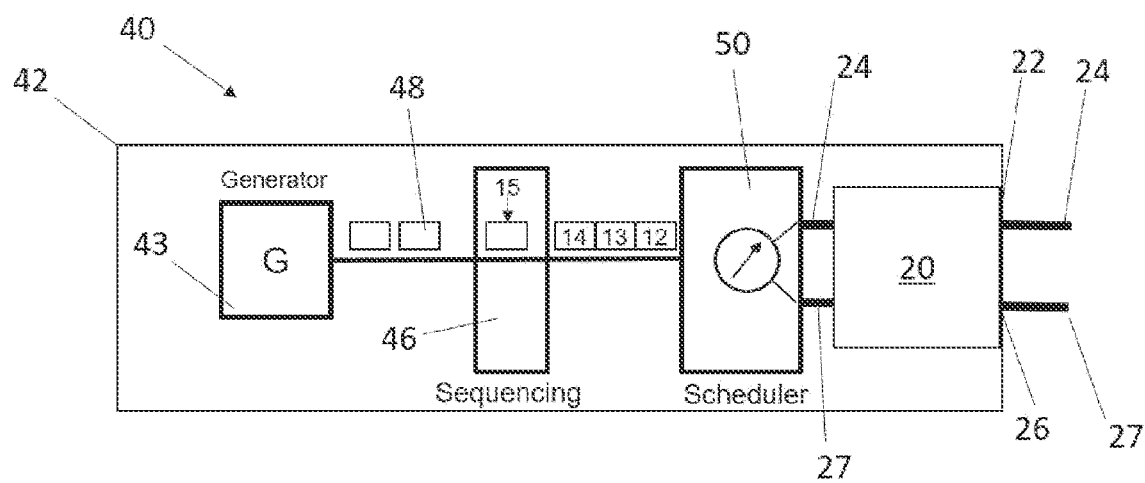
FIG. 3 shows a network entity equipped with the compatibility layer of FIG. 2.

FIG. 3 shows a network entity 40 equipped with the compatibility layer 20 of FIG. 2. The network entity 40 acts as a sender network entity 42 and comprises generic multipath units like a data generator 43 configured to generate the data packets, a sequencing unit 46 configured to sequence the data packets 48 and a scheduling unit 50 configured to distribute the data to the communication links 24, 27. In this embodiment, the compatibility layer 20 is implemented within the sender network entity 42 and receives the generic data packets which are the first communication interfaces 22a, 26a. The selection algorithm then chooses the appropriate multipath network protocol for the respective communication links 24, 27 and converts the data packets accordingly. Then the converted data packets are sent via the second communication interfaces 22b, 26b to a receiving network entity 44.

Figure 5:
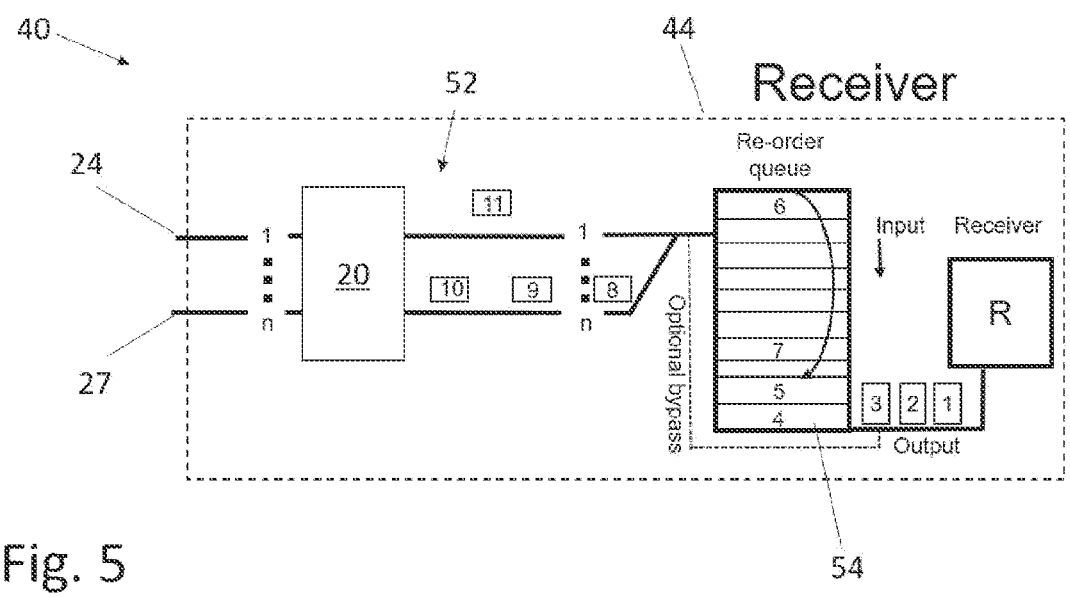
FIG. 5 shows a receiving network entity equipped with the compatibility layer of FIG. 2.

FIG. 5 shows as the network entity 40 the receiving network entity 44 equipped with the compatibility layer 20 of FIG. 2. The receiving network entity 44 is configured to receive date packets over multi paths 24, 27 in different network protocols as described above, wherein the receiving network entity 44 is configured to convert the different network protocols to a standard network protocol as described above.

Figure 4:
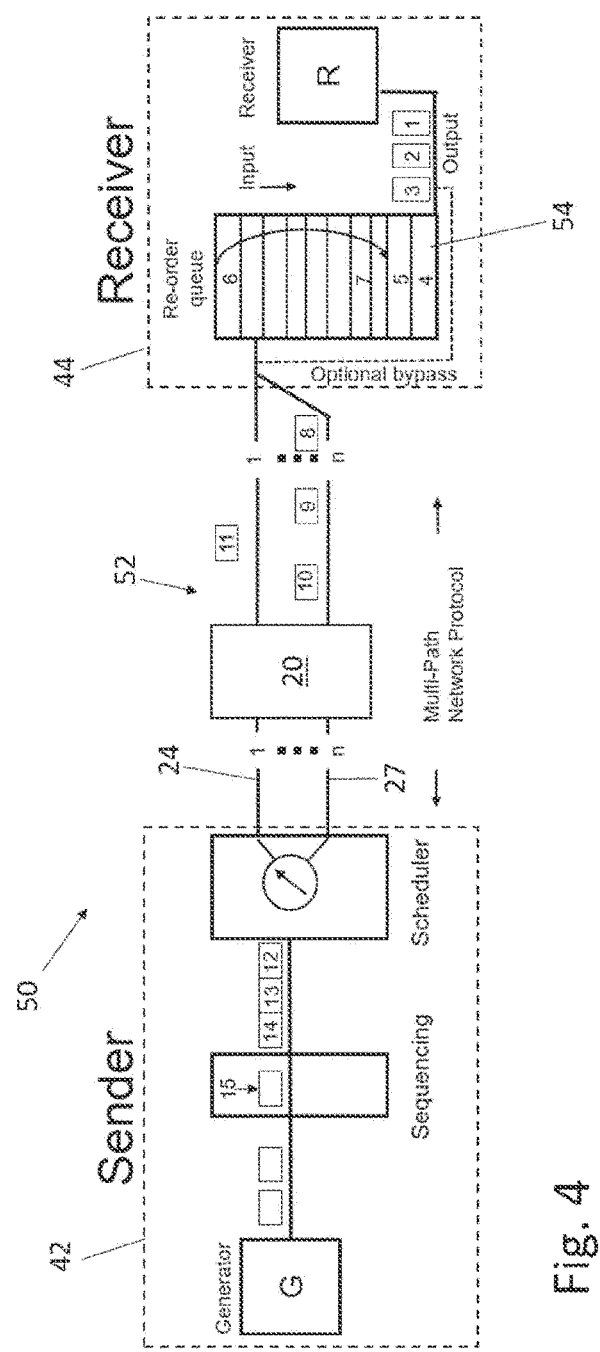
FIG. 4 shows a multipath communication system equipped with the compatibility layer of FIG. 2.

FIG. 4 shows a multipath communication system 50 equipped with the compatibility layer 20 of FIG. 2. The compatibility layer 20 is placed logically between the sender network entity 42 and the receiving network entity 44 within the communication network 52. It is also possible—as described above—to implement the compatibility layer 20 within the sender network entity 42 and/or within the receiving network entity 44. The situation shown in FIG. 4 is especially suited to enable a flexible choice of network protocols for older network entities that do not comprise a compatibility layer 20 and that cannot be upgraded. Those older network entities with tightly coupled multipath units to certain network protocols can be operated as done before and the compatibility layer 20 within the communication network 52 does the adaption of the network protocols as an independent standalone solution. The compatibility layer 20 receives data packets of certain network protocol and convert the data packets according to the selection performed by the selection algorithm.

In other words: The shim-layer 20 connects the multipath communication system 50 with the particular selected network protocol.

The selection algorithm (within the shim layer 20) is configured to assign network protocols to the decoupled multipath communication system 50. In a further step the selector algorithm is based on AI and/or machine learning data and/or as access to information about communication path type (DSL, LTE, 5G, Cable, Satellite, . . . ) or quality (e.g. RSSI, MCS, . . . ).

The receiving network entity 44 can be designed with or without a reordering unit 54. In a preferable setup, the receiver component uses the shim-layer 20 between network protocol and the reordering unit 54. To facilitate the out-of-order detection in the reordering process, the decoupled Multipath System is optionally equipped with a sequencing mechanism in the sender logic.

The choice of the selection algorithm of the individual network protocols and their tuning parameters (buffer sizes. CC, reliability . . . ) can depend on demand and/or used services and/or access type and/or access characteristics and/or time and/or location and/or bottleneck/congestion and/or multi-connectivity scenario (Hybrid Access, ATSSS, . . . ). In a more advanced setup this can be even combined with a learning algorithm which selects the network protocol(s) based on historic data.

It follows a detailed description of a possible implementation of the shim layer 20:

The shim-layer 20 of the decoupled multipath communication system 50 can use an existing interface for the underlying selected network protocols, e.g. the POSIX Socket API or the interface TAPS [23]. In case that those interfaces are not available or do not provide enough interaction possibilities between the multipath communication system 50 and network protocols, network protocol specific "translators" can be implemented. For an efficient solution, a combination of multiple interfaces may be expected, comprising of multiple protocol specific "translators" or existing approaches such as TAPS [23] or POSIX Socket API. While TAPS [23] provides one possible interface to deal with supporting transport protocols, the multipath usage is very limited to more overarching constraints. e.g. "Reliable Data Transfer" [23, 4.2.1]. "Preservation of Data Ordering" [23, 4.2.4]. "Congestion Control" [23, 4.2.9] or "Multipath Transport" [23, 4.2.13]. More detailed settings e.g. the type of congestion control, congestion control information etc. pp are not configurable and require other mechanisms. For TCP. Linux>2.4 provides a POSIX Socket API, which supports socket option TCP_INFO and gives access to e.g. the CWND. Another allows to set specific buffer sizes using SO_SNDBUF/SO_RCVBUF and yet another allows to specify the congestion control to use (TCP_CONGESTION). However, for other transport protocols such SOCKET APIs as mentioned for TCP may not be available.

In an exemplary setup, the multipath communication system 50 and/or the shim layer 20 can be configured to apply low latency multipath techniques while ensuring as much as possible in-order delivery. For that purpose. TAPS may take the initial configuration to help the network protocol selection algorithm to find the appropriate network protocols. The basic setting could be translated according to to "Multipath Transport": Require; "Reliable Data Transfer": Avoid "Preservation of Data Ordering": Require. With this information TAPS could offer to the network protocol selection logic to select DCCP as the transport protocol for fluctuating paths and UDP for stable paths. The selection logic decides then to use DCCP for a 4G link and UDP for a DSL path. To keep the latency low, the DCCP path is configured, using the POSIX Socket API, to define a latency friendly congestion control using socket option DCCP_SOCKOPT_CCID, but an individual "translator" to gain under operation the CWND for scheduling purposes. The reordering process of the multipath system uses yet another "translator" based on the Linux sysctl environment to configure in-order delivery in the limits of 50 ms to wait for outstanding packets.

The shim layer 20 has to process different information from and to the individual transport protocols (Southbound), as well as information from and to the Multipath-System (Northbound). Between a North- and Southbound interface, the different solutions like TAPS [23] and available POSIX Socket API or individual interfaces "translators" are located.

In a preferred embodiment, the Decoupled Multipath System can select for transport purposes UDP [10] and/or IP [11] and/or DCCP [7] and/or SCTP [9] and/or SCTP[12] and/or TCP [7] and/or QUIC [8] and/or GRE [13] and/or MPLS [14] and/or PPP [15] and/or HTTP(S) [16, 17, 18] and/or IPSec [19] and/or (S)RTP [20, 21] and/or RSVP [22].

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements. e.g., A, any subset from the listed elements, e.g., A and B, or the entire list of elements A, B and C.

REFERENCES

[1] A. Ford and C. Raiciu and M. Handley and O. Bonaventure, "TCP Extensions for Multipath Operation with Multiple Addresses", RFC no. 6824, January 2013;
[2] Quentin Coninck and Olivier Bonaventure, "Multipath Extensions for QUIC (MP-QUIC)", draft-deconinck-quic-multipath-5, August 2020;
[3] Markus Amend and Anna Brunstrom and Andreas Kassler and Veselin Rakocevic, "DCCP Extensions for Multipath Operation with Multiple Addresses", draft-amend-tsvwg-multipath-dccp-03, November 2019;

[4] P. Amer and M. Becke and T. Dreibholz and N. Ekiz and J. Iyengar and P. Natarajan and R. Stewart and M. Tuxen, "Load Sharing for the Stream Control Transmission Protocol (SCTP)", draft-tuexen-tsvwg-sctp-multipath-21, February 2021;

[5] Patent "Techniques for efficient reordering of data packets in multipath scenarios", EP3531637B1, Inventors: Markus Amend and Eckard Bogenfeld;

[6] "TRANSMISSION CONTROL PROTOCOL", RFC793, September 1981;

[7] S. Floyd and M. Handley and E. Kohler, "Datagram Congestion Control Protocol (DCCP)", RFC4340, March 2006;

[8] J. Iyengar and M. Thomson, "QUIC: A UDP-Based Multiplexed and Secure Transport", RFC9000, May 2021;

[9] R. Stewart, "Stream Control Transmission Protocol", RFC no. 4960, September 2007:

[10] J. Postel, "User Datagram Protocol", RFC768, August 1980;

[11] "INTERNET PROTOCOL", RFC791, September 1981;

[12] Michael A. Ramalho and Qiaobing Xie and Randall R. Stewart and Michael Tüxen and Phillip Conrad, "Stream Control Transmission Protocol (SCTP) Partial Reliability Extension", RFC no. 3758, May 2004;

[13] Tony Li and Dino Farinacci and Stanley P. Hanks and David Meyer and Paul S. Traina, "Generic Routing Encapsulation (GRE)", RFC2784, March 2000;

[14] Arun Viswanathan and Eric C. Rosen and Ross Callon, "Multiprotocol Label Switching Architecture", RFC3031, January 2001;

[15] William A. Simpson, "The Point-to-Point Protocol (PPP)", RFC1661, July 994;

[16] Henrik Nielsen and Roy T. Fielding and Tim Berners-Lee, "Hypertext Transfer Protocol—HTTP/1.0", RFC1945, May 1996;

[17] Mike Belshe and Roberto Peon and Martin Thomson, "Hypertext Transfer Protocol Version 2 (HTTP/2)", RFC7540, May 2015;

[18] Mike Bishop, "Hypertext Transfer Protocol Version 3 (HTTP/3)", draft-ietf-quic-http-34, February 2021;

[19] Karen Seo and Stephen Kent, "Security Architecture for the Internet Protocol", RFC4301, December 2005;

[20] Henning Schulzrinne and Stephen L. Casner and Ron Frederick and Van Jacobson, "RTP: A Transport Protocol for Real-Time Applications", RFC3550, July 2003;

[21] Karl Norrman and David McGrew and Mats Naslund and Elisabetta Carrara and Mark Baugher, "The Secure Real-time Transport Protocol (SRTP)", RFC3711, March 2004;

[22] Robert T. Braden and Lixia Zhang and Steven Berson and Shai Herzog and Sugih Jamin, "Resource ReSerVation Protocol (RSVP)—Version 1 Functional Specification", RFC2205, September 1997;

[23] Brian Trammell and Michael Welzl and Theresa Enghardt and Gorry Fairhurst and Mirja Kühlewind and Colin Perkins and Philipp S. Tiesel and Christopher A. Wood and Tommy Pauly and Kyle Rose, "An Abstract Application Layer Interface to Transport Services", https://datatracker.ietf.org/doc/html/draft-ietf-taps-interface-12, 9 Apr. 2021.

The invention claimed is:

1. A compatibility layer for providing a flexible choice of network protocols in a multi-path environment, the compatibility layer comprising:
 a first set of communication interfaces corresponding to a first communication link;
 a second set of communication interfaces corresponding to a second communication link; and
 a processor configured to:
  obtain network protocol information from a library of network protocols;
  perform a selection of which network protocol is to be used for the first communication link and/or the second communication link, wherein the selection is based on artificial intelligence (AI) and/or machine learning (ML) mechanisms; and
  convert data packets received from a network entity via the first communication link and/or the second communication link to at least one of the network protocols.

2. The compatibility layer of claim 1, wherein the compatibility layer is configured to provide performance information about the first communication link and/or the second communication link to a scheduler of the network entity.

3. The compatibility layer of claim 2, wherein the performance information comprises:
 network protocol specific information;
 bytes-in-flight;
 round-trip time (RTT);
 latency;
 packet loss rate;
 congestion notification; and/or
 path cost values.

4. The compatibility layer of claim 2, wherein the compatibility layer is configured to provide the performance information to the network entity.

5. The compatibility layer of claim 2, wherein the compatibility layer is configured to obtain the performance information via measurement or to receive the performance information.

6. The compatibility layer of claim 2, wherein the selection is further based on the performance information about the first communication link and/or the second communication link and based on properties of the network protocols.

7. The compatibility layer of claim 1, wherein the selection is further based on:
 demand;
 used services;
 access type;
 access characteristics;
 time;
 location;
 bottleneck or congestion; and/or
 a multi-connectivity scenario.

8. The compatibility layer of claim 1, further comprising:
 a re-ordering interface configured to transmit data packets that have been converted to the network entity for re-ordering.

9. The compatibility layer of claim 1, wherein the compatibility layer is part of a user equipment or a server unit.

10. The compatibility layer of claim 1, wherein the library of network protocols is stored in the compatibility layer.

11. The compatibility layer of claim 1, wherein the library of network protocols is accessible via a library interface.

12. A multipath communication system, comprising:
 a communication network configured to provide at least two communication links;

a first network entity configured to send data packets via the at least two communication links;

a second network entity configured to receive the data packets via the at least two communication links; and a compatibility layer, comprising a first set of communication interfaces corresponding to a first communication link and a second set of communication interfaces corresponding to a second communication link;

wherein the compatibility layer is configured to:
- obtain network protocol information from a library of network protocols;
- perform a selection of which network protocol is to be used for the first communication link and/or the second communication link, wherein the selection is based on artificial intelligence (AI) and/or machine learning (ML) mechanisms; and
- convert data packets received via the first communication link and/or the second communication link to at least one of the network protocols.

13. A method for providing a flexible choice of network protocols in a multi-path environment, the method comprising:

receiving, by a compatibility layer, data packets via a first communication link and/or a second communication link;

obtaining, by the compatibility layer, network protocol information from a library of network protocols;

performing, by the compatibility layer, a selection of which network protocol is to be used for the first communication link and/or the second communication link, wherein the selection is based on artificial intelligence (AI) and/or machine learning (ML) mechanisms; and converting, by the compatibility layer, the data packets received via the first communication link and/or the second communication link to at least one of the network protocols.

* * * * *